US012471397B2

(12) United States Patent
Inoue

(10) Patent No.: US 12,471,397 B2
(45) Date of Patent: Nov. 11, 2025

(54) IMAGING ELEMENT AND IMAGING DEVICE

(71) Applicant: SONY SEMICONDUCTOR SOLUTIONS CORPORATION, Kanagawa (JP)

(72) Inventor: Kouichi Inoue, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 554 days.

(21) Appl. No.: 17/776,020

(22) PCT Filed: Sep. 30, 2020

(86) PCT No.: PCT/JP2020/037267
§ 371 (c)(1),
(2) Date: May 11, 2022

(87) PCT Pub. No.: WO2021/100330
PCT Pub. Date: May 27, 2021

(65) Prior Publication Data

US 2022/0392939 A1 Dec. 8, 2022

(30) Foreign Application Priority Data

Nov. 19, 2019 (JP) ................................ 2019-209191

(51) Int. Cl.
*H10F 39/00* (2025.01)
*H10F 39/18* (2025.01)

(52) U.S. Cl.
CPC ......... *H10F 39/806* (2025.01); *H10F 39/024* (2025.01); *H10F 39/182* (2025.01);
(Continued)

(58) Field of Classification Search
None
See application file for complete search history.

(56) References Cited

U.S. PATENT DOCUMENTS

2005/0056901 A1* 3/2005 Kuriyama ............ H10F 39/024
257/E31.128
2007/0040102 A1* 2/2007 Mouli ............... H01L 27/14623
250/214.1

(Continued)

FOREIGN PATENT DOCUMENTS

CN 101800233 A 8/2010
CN 110419106 A 11/2019

(Continued)

OTHER PUBLICATIONS

International Search Report and Written Opinion of PCT Application No. PCT/JP2020/037267, issued on Nov. 10, 2020, 09 pages of ISRWO.

*Primary Examiner* — Cory W Eskridge
(74) *Attorney, Agent, or Firm* — CHIP LAW GROUP

(57) ABSTRACT

To improve the sensitivity of the imaging element. An imaging element includes pixels and a light guide wall. The pixels each include: a photoelectric conversion unit arranged in a semiconductor substrate to perform photoelectric conversion on incident light, an on-chip lens that concentrates the incident light on the photoelectric conversion unit, a color filter that transmits incident light having a predetermined wavelength within the concentrated incident light, and an interlayer film disposed between the semiconductor substrate and the color filter. The light guide wall is disposed at a boundary of the pixels and formed in a shape of surrounding the color filter, the light guide wall having an end portion disposed in a recess surrounding the pixel formed in the interlayer film at the boundary of the pixels to guide the incident light.

18 Claims, 19 Drawing Sheets

20
10
1
11
PIXEL ARRAY UNIT
100
VERTICAL DRIVING UNIT
41
40
12
42
CONTROL UNIT
COLUMN SIGNAL PROCESSING UNIT
IMAGE SIGNAL
30

(52) U.S. Cl.
CPC ..... *H10F 39/8053* (2025.01); *H10F 39/8063* (2025.01); *H10F 39/807* (2025.01)

(56) References Cited

U.S. PATENT DOCUMENTS

| | | | | |
|---|---|---|---|---|
| 2007/0045511 | A1* | 3/2007 | Lee | H10F 39/8057 257/E27.132 |
| 2007/0237888 | A1* | 10/2007 | Liu | H10F 39/8057 257/E31.121 |
| 2010/0038740 | A1* | 2/2010 | Fereyre | H10F 39/8053 257/437 |
| 2012/0261782 | A1* | 10/2012 | Kobayashi | H10F 39/8053 257/E31.127 |
| 2013/0001724 | A1* | 1/2013 | Masuda | H01L 27/14621 257/E31.127 |
| 2013/0193547 | A1 | 8/2013 | Nakazawa | |
| 2015/0015768 | A1* | 1/2015 | Tanaka | H04N 25/134 348/342 |
| 2016/0343765 | A1 | 11/2016 | Tu | |
| 2017/0294470 | A1 | 10/2017 | Takami et al. | |
| 2018/0286904 | A1* | 10/2018 | Tazoe | H01L 27/14621 |

FOREIGN PATENT DOCUMENTS

| | | | |
|---|---|---|---|
| JP | 2010-539675 | A | 12/2010 |
| JP | 2013-157422 | A | 8/2013 |
| JP | 2016-219770 | A | 12/2016 |
| JP | 2017-188571 | A | 10/2017 |
| JP | 2018-088532 | A | 6/2018 |
| WO | 2017/073321 | A1 | 5/2017 |

* cited by examiner

IMAGING ELEMENT AND IMAGING DEVICE

CROSS REFERENCE TO RELATED APPLICATIONS

This application is a U.S. National Phase of International Patent Application No. PCT/JP2020/037267 filed on Sep. 30, 2020, which claims priority benefit of Japanese Patent Application No. JP 2019-209191 filed in the Japan Patent Office on Nov. 19, 2019. Each of the above-referenced applications is hereby incorporated herein by reference in its entirety.

TECHNICAL FIELD

The present disclosure relates to an imaging element and an imaging device. More specifically, the present disclosure relates to an imaging element in which a plurality of pixels are arranged and an imaging device using the imaging element.

BACKGROUND ART

Conventionally, an imaging element in which a plurality of pixels that perform photoelectric conversion on incident light to generate an image signal are arranged has been used. In this imaging element, a color image signal can be generated by arranging a color filter that transmits incident light having a predetermined wavelength in the pixels. In an imaging element in which pixels provided with such a color filter are arranged, the image quality deteriorates when light having passed through a color filter corresponding to a different wavelength of an adjacent pixel is obliquely incident. This is because the incident light having a wavelength different from the incident light transmitted by the color filter arranged in the pixel is mixed and causes color mixing. In order to prevent this color mixing, an imaging element has been proposed in which a partition wall is arranged at the boundary of pixels to separate color filters of adjacent pixels. For example, there has been proposed an imaging element in which a first wall formed by sequentially stacking a light blocking film that blocks incident light and a low refractive index film having a lower refractive index than the light blocking film is arranged at the boundary of pixels (see, for example, PTL 1).

In the above-mentioned conventional technique, the low refractive index film of the first wall is configured to have a lower refractive index than the light blocking film and the color filter, and can prevent the occurrence of color mixing by reflecting incident light from adjacent pixels. On the other hand, this low refractive index film is expected to have an action of guiding the incident light to its subject pixel to a semiconductor region where photoelectric conversion is performed, and contributes to the improvement of sensitivity.

CITATION LIST

Patent Literature

[PTL 1]
WO 2017/073321

SUMMARY

Technical Problem

The above-mentioned conventional technique has a problem that the sensitivity is not sufficiently improved. The light blocking film is arranged at the bottom of the first wall described above. This light blocking film is configured to have a relatively thick film thickness, and is arranged in a shape adjacent to the lower layer portion of the color filter. Therefore, the light guiding by the low refractive index film is interrupted in the upper layer portion of the color filter, and the incident light incident on the first wall on the lower layer of the color filter is absorbed by the light blocking film. Due to this, there is a problem that the sensitivity is not sufficiently improved.

The present disclosure has been made in view of the above-mentioned problems, and an object thereof is to improve the sensitivity of the imaging element.

Solution to Problem

The present disclosure has been made in order to solve the above-mentioned problems, and a first aspect thereof provides an imaging element including: pixels each including: a photoelectric conversion unit arranged in a semiconductor substrate to perform photoelectric conversion on incident light, an on-chip lens that concentrates the incident light on the photoelectric conversion unit, a color filter that transmits incident light having a predetermined wavelength within the concentrated incident light, and an interlayer film disposed between the semiconductor substrate and the color filter; and a light guide wall disposed at a boundary of the pixels and formed in a shape of surrounding the color filter, the light guide wall having an end portion disposed in a recess surrounding the pixel formed in the interlayer film at the boundary of the pixels to guide the incident light.

In the first aspect, the light guide wall may be formed of a member having a refractive index different from that of the color filter.

In the first aspect, the light guide wall may be formed of a member having a refractive index lower than that of the color filter.

In the first aspect, the light guide wall may be made of an oxide.

In the first aspect, the light guide wall may be made of a resin.

In the first aspect, the light guide wall may be formed of voids.

In the first aspect, the imaging element may further include a separation portion that is arranged in the semiconductor substrate at the boundary of the pixels to separate the photoelectric conversion units.

In the first aspect, the imaging element may further include a light guide wall bottom film which is a film arranged at a bottom of the recess and adjacent to the light guide wall.

In the first aspect, the light guide wall bottom film may be further arranged on side surfaces of the recess.

In the first aspect, the light guide wall bottom film may be a film that stops the progress of etching when the light guide wall is formed by etching.

In the first aspect, the light guide wall bottom film may be a film that blocks the incident light.

In the first aspect, the light guide wall bottom film may be a film that brings the light guide wall into close contact with the interlayer film.

In the first aspect, the light guide wall bottom film may be a film that prevents movement of contaminants to the semiconductor substrate.

In the first aspect, the light guide wall bottom film may be made of metal.

In the first aspect, the light guide wall bottom film may be made of a silicon nitride.

In the first aspect, the light guide wall bottom film may be made of an oxide.

In the first aspect, the imaging element may further include a protective film arranged between the color filter and the light guide wall.

A second aspect of the present disclosure provides an imaging device including: pixels each including: a photoelectric conversion unit arranged in a semiconductor substrate to perform photoelectric conversion on incident light, an on-chip lens that concentrates the incident light on the photoelectric conversion unit, a color filter that transmits incident light having a predetermined wavelength within the concentrated incident light, and an interlayer film disposed between the semiconductor substrate and the color filter; a light guide wall disposed at a boundary of the pixels and formed in a shape of surrounding the color filter, the light guide wall having an end portion disposed in a recess surrounding the pixel formed in the interlayer film at the boundary of the pixels to guide the incident light; and a processing circuit that processes an image signal generated based on the photoelectric conversion.

According to the aspects of the present disclosure, a light guide wall having a shape surrounding a portion of the interlayer film and the color filter is arranged. It is expected that the incident light is guided in the region extending from the color filter to a portion of the interlayer film.

DESCRIPTION OF EMBODIMENTS

Figure 1:
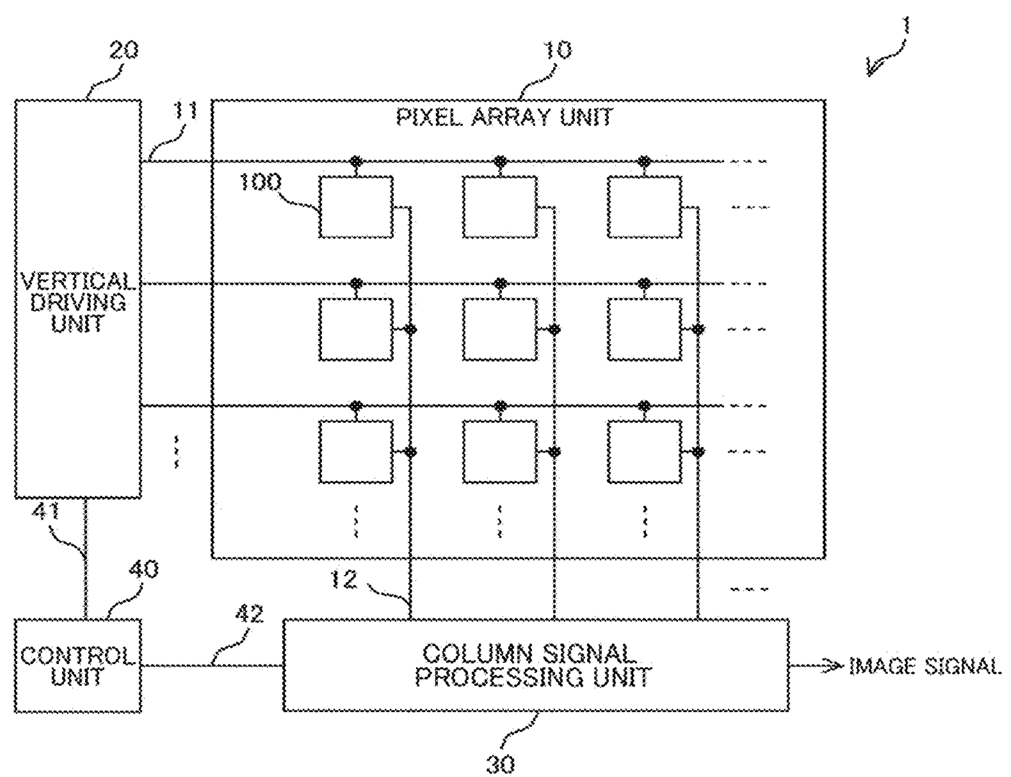
FIG. 1 is a diagram illustrating a configuration example of an imaging element according to an embodiment of the present disclosure.

Next, embodiments for implementing the present disclosure (hereinafter, referred to as embodiments) will be described with reference to the drawings. In the following drawings, the same or similar portions are denoted by the same or similar reference numerals and signs. In addition, embodiments will be described in the following order.

1. First Embodiment
2. Second Embodiment
3. Third Embodiment
4. Fourth Embodiment
5. Fifth Embodiment
6. Example of application to camera

1. First Embodiment

[Configuration of Imaging Element]

FIG. 1 is a diagram illustrating a configuration example of an imaging element according to an embodiment of the present disclosure. In the figure, the imaging element 1 includes a pixel array unit 10, a vertical driving unit 20, a column signal processing unit 30, and a control unit 40.

The pixel array unit 10 is configured with pixels 100 disposed in a two-dimensional lattice form. Here, the pixels 100 generates image signals in response to radiated light. Each pixel 100 has a photoelectric conversion unit that generates charges in response to radiated light. In addition, each pixel 100 further has a pixel circuit. The pixel circuit generates an image signal based on charges generated by the photoelectric conversion unit. Generation of an image signal is controlled by a control signal generated by the vertical driving unit 20 which will be described later. Signal lines 11 and 12 are disposed in an XY matrix form in the pixel array unit 10. A signal line 11 is a signal line through which a control signal of the pixel circuit in the pixels 100 is transmitted, is disposed for each row of the pixel array unit 10, and is commonly wired for pixels 100 disposed in each row. A signal line 12 is a signal line through which an image signal generated by the pixel circuit of the pixel 100 is transmitted, is disposed for each column of the pixel array unit 10, and is commonly wired for pixels 100 disposed in each column. The photoelectric conversion unit and the pixel circuit are formed on a semiconductor substrate.

The vertical driving unit 20 generates the control signal of the pixel circuits of the pixels 100. The vertical driving unit 20 transmits the generated control signal to the pixels 100 through the signal lines 11 in the figure. The column signal processing unit 30 processes an image signal generated by the pixels 100. The column signal processing unit 30 processes an image signal transmitted from the pixels 100 through the signal lines 12 in the figure. Processing in the column signal processing unit 30 corresponds to, for example, analog-to-digital conversion of converting an analog image signal generated in the pixels 100 into a digital image signal. The image signal processed by the column signal processing unit 30 is output as an image signal of the imaging element 1. The control unit 40 controls the overall imaging element 1. The control unit 40 generates and outputs control signals for controlling the vertical driving unit 20 and the column signal processing unit 30 to control the imaging element 1. The control signals generated by the control unit 40 are transmitted to the vertical driving unit 20 and the column signal processing unit 30 through signal lines 41 and 42.

[Pixel Configuration]

Figure 2:
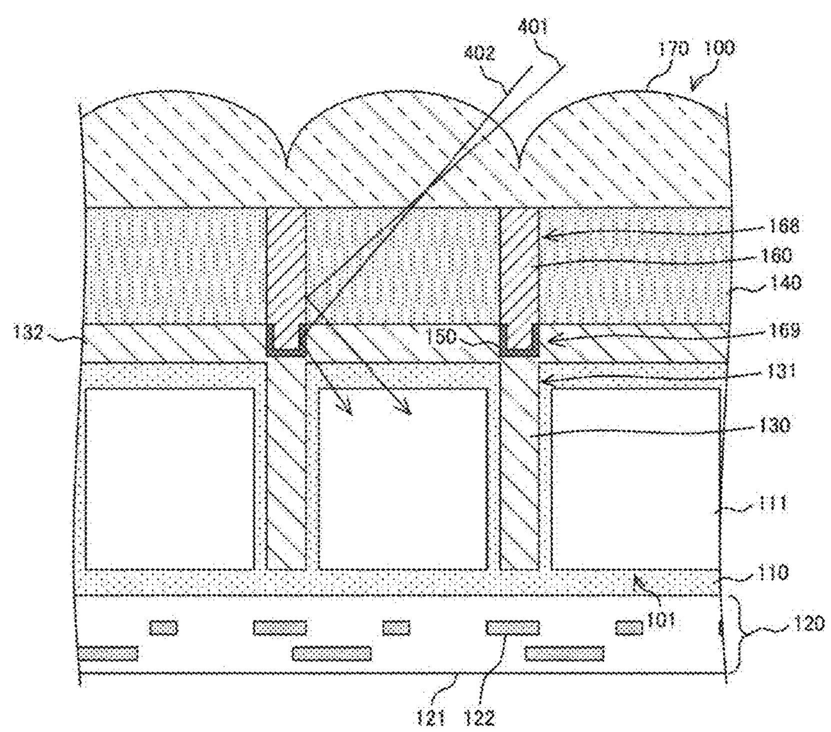
FIG. 2 is a diagram illustrating a configuration example of the pixel according to the first embodiment of the present disclosure.

FIG. 2 is a diagram illustrating a configuration example of a pixel according to the first embodiment of the present disclosure. The figure is a schematic cross-sectional view illustrating a configuration example of the pixel 100. The pixel 100 includes a semiconductor substrate 110, a wiring region 120, a separation portion 130, an interlayer film 132, a color filter 140, an on-chip lens 170, a light guide wall 160, and a light guide wall bottom film 150.

The semiconductor substrate 110 is a semiconductor substrate on which a diffusion region of elements of a photoelectric conversion unit and a pixel circuit is formed. The semiconductor substrate 110 can be formed of, for example, silicon (Si). The diffusion region of the elements of the photoelectric conversion unit and the pixel circuit can be arranged in the well region formed on the semiconductor substrate 110. For convenience, it is assumed that the semiconductor substrate 110 in the figure constitutes a p-type well region. By arranging an n-type semiconductor region in the p-type well region, it is possible to form a diffusion region of the elements of the photoelectric conversion unit and the like. In the figure, the photoelectric conversion unit 101 is illustrated as an example of the element. The photoelectric conversion unit 101 is formed of an n-type semiconductor region 111 arranged in a p-type well region. Specifically, a photodiode formed of a pn junction between the n-type semiconductor region 111 and a p-type well region around the n-type semiconductor region 111 corresponds to the photoelectric conversion unit 101. In the semiconductor substrate 110, a separation portion 130 described later is arranged at the boundary portion of the pixels 100.

The wiring region 120 is a region which is arranged on the front surface side of the semiconductor substrate 110 and in which wirings for transmitting signals and the like to the elements of the pixel circuit are formed. The wiring region 120 includes a wiring layer 122 and an insulating layer 121. The wiring layer 122 is wirings for transmitting signals and the like to the elements of the pixel circuit. The wiring layer 122 can be made of a metal such as copper (Cu), tungsten (W), or aluminum (Al). The insulating layer 121 insulates the wiring layer 122. The insulating layer 121 can be made of an insulating material such as a silicon oxide ($SiO_2$) or a silicon nitride (SiN).

The separation portion 130 is arranged in the semiconductor substrate 110 to separate the pixels 100. The separation portion 130 is arranged in a groove 131 formed at the boundary of the pixels 100 of the semiconductor substrate 110. The separation portion 130 can be made of, for example, an insulating material such as $SiO_2$. The separation portion 130 may be made of a metal such as W. When arranging the separation portion 130 made of metal, an insulating film for insulating the semiconductor substrate 110 and the separation portion 130 in the groove 131 can be arranged. By arranging the separation portion 130, it is possible to prevent the electric charge generated by the photoelectric conversion unit 101 of the pixel 100 from moving to the adjacent pixel 100, and it is possible to prevent noise from being mixed in the image signal. The separation portion 130 in the figure shows an example in which it is configured in a shape that it is arranged in the groove 131 formed from the back surface side of the semiconductor substrate 110, and the bottom portion reaches the vicinity of the front surface side of the semiconductor substrate 110. The separation portion 130 can also be configured in a shape that penetrates the semiconductor substrate 110. The separation portion 130 can be arranged in the groove formed from the front surface side of the semiconductor substrate 110.

The interlayer film 132 is a film arranged on the back surface side of the semiconductor substrate 110 to protect the semiconductor substrate 110. The interlayer film 132 immobilizes and protects the back surface side of the semiconductor substrate 110, and also prevents contaminants from diffusing from the color filter 140 and the like, which will be described later, into the semiconductor substrate 110. The interlayer film 132 can be made of, for example, an insulating material such as $SiO_2$. The interlayer film 132 can be configured to have a thickness of 200 to 300 nm. By arranging the interlayer film 132 having a relatively thick film thickness in this way, it is possible to suppress the diffusion of contaminants into the semiconductor substrate 110 and prevent the occurrence of contamination. A portion of a light guide wall 160, which will be described later, is arranged on the interlayer film 132 at the boundary of the pixels 100.

The color filter 140 is an optical filter that transmits incident light having a predetermined wavelength within the incident light of the pixel 100. The color filter 140 is arranged adjacent to the interlayer film 132. As the color filter 140, three types of color filters 140 that transmit red light, green light, and blue light can be used. One of these three types of color filters 140 can be arranged in each pixel 100.

The on-chip lens 170 is a lens arranged for each pixel 100 to concentrate the incident light on the photoelectric conversion unit 101. The on-chip lens 170 is configured in a hemispherical shape to concentrate incident light. The on-chip lens 170 can be made of an inorganic material such as SiN or an organic material such as an acrylic resin. The on-chip lens 170 in the figure is arranged adjacent to the color filter 140.

The imaging element in the figure corresponds to a backside-illuminated imaging element in which the back surface side of the semiconductor substrate 110 is irradiated with incident light.

The light guide wall 160 is arranged at the boundary of the pixels 100 to guide the incident light having passed through the on-chip lens 170 to the semiconductor substrate 110. The light guide wall 160 is configured in a shape of surrounding the color filter 140. That is, the light guide wall 160 is arranged in a groove 168 formed at the boundary of the pixels 100, and is configured in a cylindrical shape. The light guide wall 160 is configured in a shape that the end portion thereof is embedded in the interlayer film 132. Specifically, the end portion of the light guide wall 160 is arranged in the recess 169 arranged in the interlayer film 132 at the boundary of the pixels 100 to surround the pixels 100.

Since the incident light perpendicularly incident on the pixel 100 is concentrated on the central portion of the pixel 100 by the on-chip lens 170, it reaches the photoelectric conversion unit 101 without reaching the light guide wall 160. On the other hand, the incident light obliquely incident on the pixel 100 is reflected by the light guide wall 160 and incident on the photoelectric conversion unit 101. The arrows in the figure represent incident light components 401 and 402 obliquely incident on the pixel 100. Both of these incident light components 401 and 402 are reflected at the interface of the light guide wall 160 and are incident on the photoelectric conversion unit 101. The incident light 401 represents the incident light reflected by the light guide wall 160 adjacent to the color filter 140, and the incident light 402 represents the incident light reflected by the light guide wall 160 adjacent to the interlayer film 132. In this way, the light guide wall 160 can guide the obliquely incident light to the photoelectric conversion unit 101 while reflecting the same.

As will be described later in FIG. 19, in an imaging device such as a camera, light from the subject is concentrated on the pixel array unit 10 of the imaging element 1 by a photographing lens that forms an image of the subject. Light from the subject is substantially vertically incident on the pixels 100 arranged at the center of the pixel array unit 10. On the other hand, the light from the subject is obliquely incident on the pixels 100 arranged on the peripheral edge of the pixel array unit 10. When the light guide wall 160 is not arranged, the obliquely incident light is incident on the photoelectric conversion unit 101 of the adjacent pixel 100 after crossing the color filter 140, and thus causing color mixing. Here, the color mixing is a phenomenon in which noise is mixed in the image signal due to the influence of the incident light having passed through the color filter 140 of a different type from the color filter 140 arranged in the subject pixel 100. In order to prevent the occurrence of this color mixing, pupil correction is performed in which the on-chip lens 170 and the color filter 140 are arranged so as to be displaced toward the center of the pixel array unit 10.

By arranging the light guide wall 160 on the pixel 100 as described above, the obliquely incident light can be reflected in the direction of the semiconductor substrate 110. Since the occurrence of color mixing can be suppressed, it is not necessary to adopt pupil correction in the pixel 100 in the figure.

The light guide wall 160 is arranged in a region extending from the color filter 140 to the interlayer film 132. By forming the bottom of the recess 169 of the interlayer film 132 in a shape of reaching the vicinity of the back surface of the semiconductor substrate 110, the bottom of the light guide wall 160 can be brought close to the junction portion of the interlayer film 132 and the semiconductor substrate 110. The light guide wall 160 is configured to have a shape extending from the light receiving end of the incident light of the color filter 140 at the boundary of the pixels 100 to the vicinity of the junction surface of the interlayer film 132 with the semiconductor substrate 110. Thus, it is possible to guide the incident light using the light guide wall 160 seamlessly from the color filter 140 to the vicinity of the semiconductor substrate 110. Leakage and absorption of incident light from the side surface of the pixel 100 can be suppressed, and the sensitivity of the pixel 100 can be improved. Even when the interlayer film 132 having a relatively thick film thickness is arranged, the incident light can be guided to the semiconductor substrate 110.

The light guide wall 160 can be formed of a member having a refractive index different from that of the color filter 140. For example, the light guide wall 160 can be made of an oxide such as $SiO_2$ or a resin. Further, it is preferable that the light guide wall 160 is formed of a member having a refractive index lower than that of the color filter 140. This is because an optical waveguide having the color filter 140 and the light guide wall 160 as a core and a cladding, respectively, is formed, and the incident light having passed through the light guide wall 160 can be reduced. The light guiding efficiency of incident light can be further improved.

As described above, the light guide wall 160 is configured in a cylindrical shape surrounding the color filter 140 and the like. The light guide wall 160 can be formed, for example, by arranging a material film of the light guide wall 160 on the back surface side of the semiconductor substrate 110 before arranging the color filter 140 and etching the material film present at positions other than the boundary of the pixels 100. After that, the pixels 100 can be formed by arranging the color filter 140 inside the cylindrical light guide wall 160.

Further, the light guide wall 160 can be formed, for example, by arranging the color filter 140 and then etching the color filter 140 at the boundary portion of the pixels 100 to form the groove 168, and embedding the material of the light guide wall 160 in the groove 168.

The light guide wall bottom film 150 is a film arranged at the bottom of the recess 169 of the interlayer film 132. The light guide wall bottom film 150 is arranged adjacent to the light guide wall 160. The light guide wall bottom film 150 in the figure shows an example in which it is arranged on the bottom and side surfaces of the recess 169. An etching stopper film can be applied to the light guide wall bottom film 150. Here, the etching stopper is one that stops the progress of etching.

As described above, the light guide wall 160 can be formed by etching the material film of the light guide wall 160. The light guide wall bottom film 150 can be arranged as a film for stopping the progress of etching of the material film of the light guide wall 160 in this etching process. Specifically, the light guide wall bottom film 150 formed of a member having a high selectivity with respect to the material film of the light guide wall 160, that is, a member having a lower etching rate than the material film of the light guide wall 160 is arranged on the surface of the interlayer film 132 in which the recess 169 is formed. Next, the material film of the light guide wall 160 is stacked on the light guide wall bottom film 150, and the material film of the light guide wall 160 present at positions other than the boundary of the pixels 100 is etched. At the time of this etching, the progress of etching is stopped by the light guide wall bottom film 150 arranged under the material film of the light guide wall 160. Thus, it is possible to prevent the interlayer film 132 from being damaged due to excessive etching.

Further, by arranging the light guide wall bottom film 150 having the function of the etching stopper, the etching depth can be easily adjusted and the shape of the region to be etched can be stabilized. Such a light guide wall bottom film 150 can be made of, for example, metal or SiN.

Further, a film that blocks incident light can be applied to the light guide wall bottom film 150. As a result, it is possible to prevent incident light or the like that passes through the end of the on-chip lens 170 and passes through the inside of the light guide wall 160 from entering the semiconductor substrate 110. Thus, it is possible to prevent the occurrence of flare. Such a light guide wall bottom film 150 can be made of, for example, a metal such as W or Al.

Further, a film that brings the light guide wall 160 into close contact with the interlayer film 132 can be applied to the light guide wall bottom film 150. When forming the light guide wall 160 as described above, the color filter 140 is arranged after the cylindrical light guide wall 160 is formed on the surface of the interlayer film 132. This can be performed, for example, by applying the material of the color filter 140. If the adhesion strength between the light guide wall bottom film 150 and the light guide wall 160 is insufficient, the light guide wall 160 is damaged when the color filter 140 or the like is formed. Therefore, by arranging the light guide wall bottom film 150 having high adhesion strength on both the interlayer film 132 and the light guide wall 160, damage to the light guide wall 160 can be prevented. Such a light guide wall bottom film 150 can be made of, for example, $SiO_2$.

Further, a film that prevents the movement of contaminants to the semiconductor substrate 110 can be applied to the light guide wall bottom film 150. When contaminants from the light guide wall 160 and the like diffuse into the semiconductor substrate 110, contamination occurs and affects the image signal. Further, contaminants such as metal contained in the color filter 140 may diffuse into the semiconductor substrate 110 through the light guide wall 160. Therefore, the light guide wall bottom film 150 that serves as a barrier for contaminants is arranged to prevent the diffusion of contaminants. As a result, it is possible to prevent the generation of noise in the image signal. Such a light guide wall bottom film 150 can be made of, for example, $SiO_2$.

[Method for Manufacturing Imaging Element]

Figure 3A:
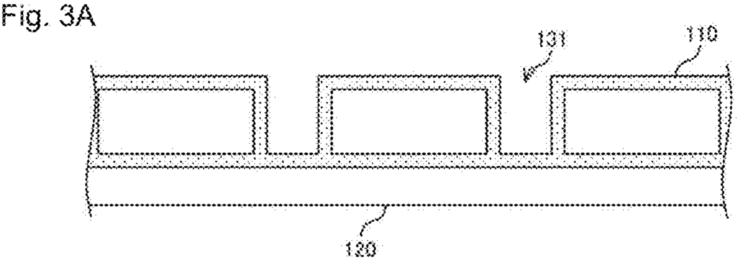
FIGS. 3A, 3B, and 3C are diagrams illustrating an example of a method for manufacturing an imaging element according to the first embodiment of the present disclosure.

FIGS. 3A, 3B, 3C, 4A, 4B, 4C, 5A, 5B, 5C, 6A, and 6B are diagrams illustrating an example of a method for manufacturing the imaging element according to the first embodiment of the present disclosure. FIGS. 3A, 3B, 3C, 4A, 4B, 4C, 5A, 5B, 5C, 6A, and 6B are diagrams illustrating an example of a manufacturing process of the imaging element 1. First, a well region, an n-type semiconductor region 111, and the like are formed on the semiconductor substrate 110 to form the wiring region 120. Next, the semiconductor substrate 110 is inverted upside down to form the groove 131 in the region where the separation portion 130 is arranged. This can be performed by dry etching (FIG. 3A).

Next, the interlayer film 132 is arranged on the back surface side of the semiconductor substrate 110. At this time, the material film of the interlayer film 132 is also arranged in the groove 131. This can be performed, for example, by forming a film of $SiO_2$ using chemical vapor deposition (CVD). In this way, the separation portion 130 can be formed. As described above, when the separation portion 130 and the interlayer film 132 are made of the same material, they can be formed at the same time.

Figure 3B:
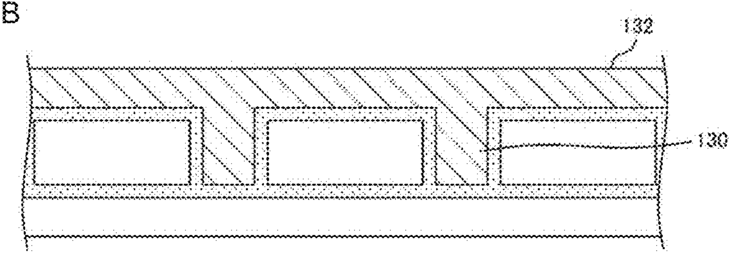
Figure 3C:
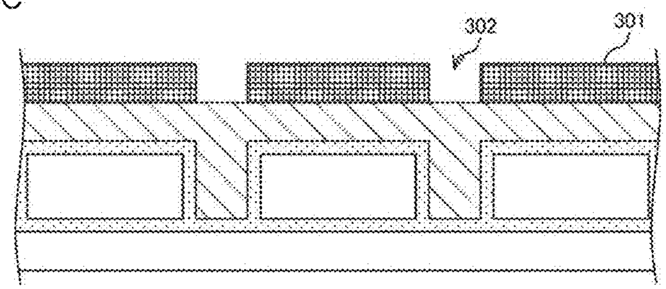

Next, a resist 301 is arranged on the surface of the interlayer film 132. In this resist 301, an opening 302 is formed in a region where the light guide wall 160 is arranged (FIG. 3B).

Figure 4A:
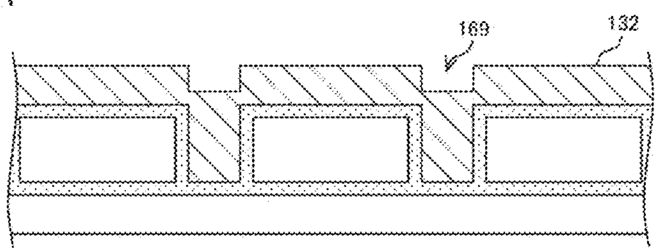
FIGS. 4A, 4B, and 4C are diagrams illustrating an example of a method for manufacturing an imaging element according to the first embodiment of the present disclosure.

Next, etching is performed using the resist 301 as a mask to form the recess 169 in the interlayer film 132. This can be performed, for example, by dry etching. Then, the resist 301 is peeled off (FIG. 4A). This process corresponds to a recess forming process.

Figure 4B:
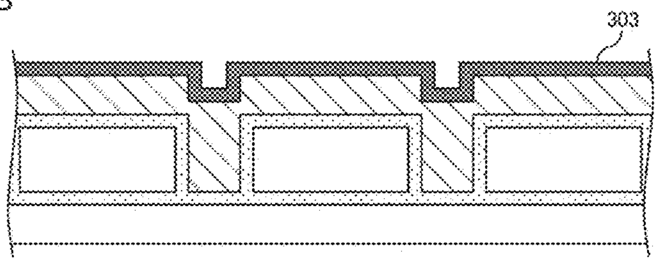

Next, the material film 303 of the light guide wall bottom film 150 is arranged on the surface of the interlayer film 132. This can be performed, for example, by forming a SiN film using CVD (FIG. 4B).

Figure 4C:
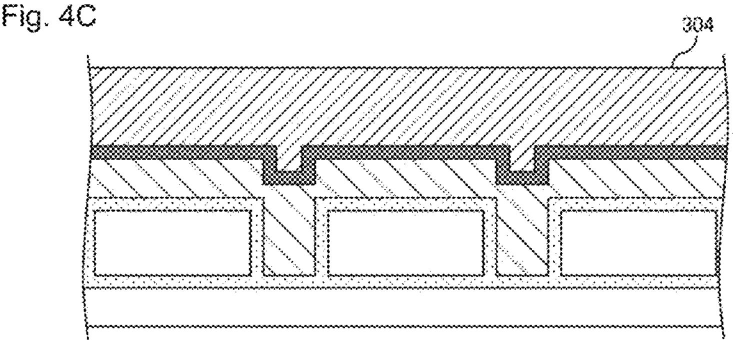

Next, the material film 304 of the light guide wall 160 is arranged on the surface of the material film 303. This can be performed, for example, by forming a film of SiO2 using CVD (FIG. 4C).

Figure 5A:
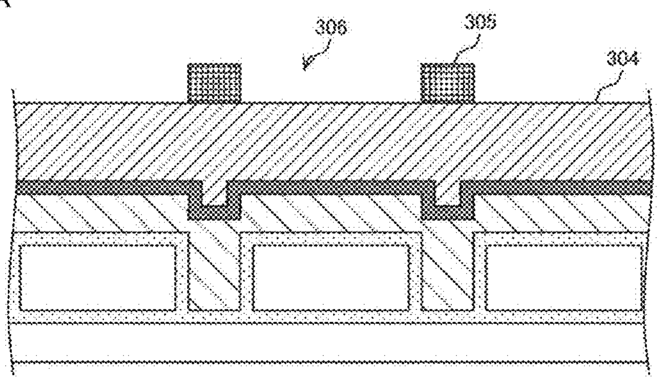
FIGS. 5A, 5B, and 5C are diagrams illustrating an example of a method for manufacturing an imaging element according to the first embodiment of the present disclosure.

Next, a resist 305 is arranged on the surface of the material film 304. The resist 305 has an opening 306 formed in a region other than the region where the light guide wall 160 is arranged (FIG. 5A).

Figure 5B:
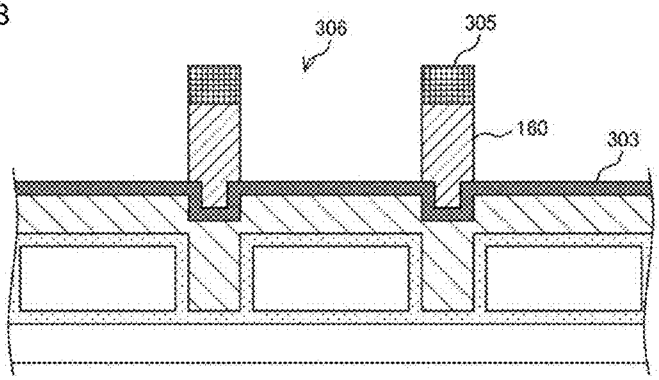

Next, the resist 305 is used as a mask to etch the material film 304. This can be performed by dry etching. At the time of this etching, the material film 303 acts as an etching stopper by performing the etching under the condition that the selectivity of the material film 303 of the light guide wall bottom film 150 is higher than that of the material film 304. By this etching, the material film 304 in the opening 302 of the resist 305 is removed (FIG. 5B). This process corresponds to a light guide wall arranging process.

Figure 5C:
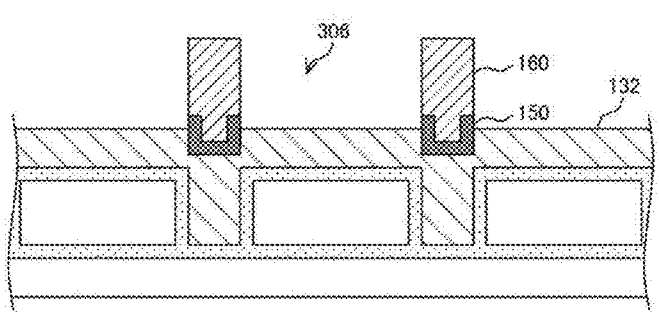

Next, the material film 303 of the light guide wall bottom film 150 in a region other than the bottom of the light guide wall 160 is removed. This can be performed by dry etching or wet etching with a phosphoric acid. At the time of this etching, the material film 303 in the region of the opening 306 is etched and removed by performing the etching under the condition that the selectivity of the light guide wall 160 is higher than that of the material film 303. As a result, the light guide wall bottom film 150 is formed. Then, the resist 305 is peeled off (FIG. 5C).

Figure 6A:
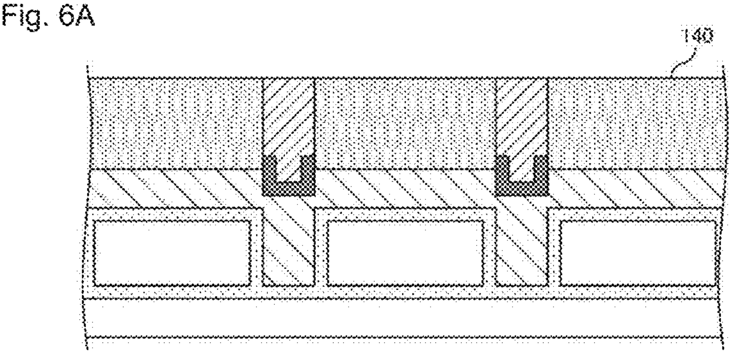
FIGS. 6A and 6B are diagrams illustrating an example of a method for manufacturing an imaging element according to the first embodiment of the present disclosure.

Next, the color filter 140 is arranged in the opening 306. This is done for each type of color filters 140 (FIG. 6A).

Figure 6B:
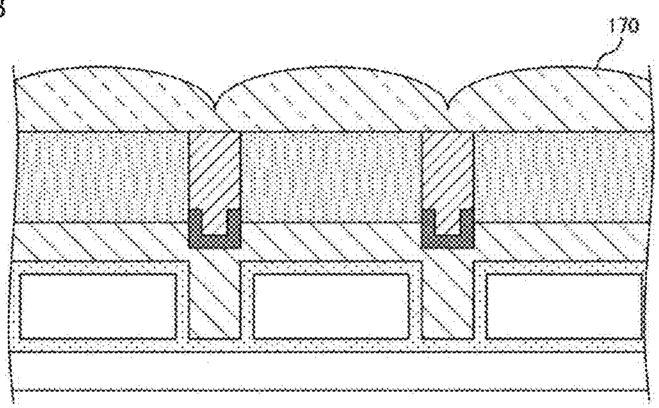

Next, the on-chip lens 170 is arranged on the surface of the color filter 140. This can be performed by a known method (FIG. 6B). By the above-described processes, the imaging element 1 can be manufactured.

[Another Method for Manufacturing Imaging Element]

FIGS. 7A, 7B, 7C, 8A, 8B, and 8C are diagrams illustrating another example of a method for manufacturing an imaging element according to the first embodiment of the present disclosure. FIGS. 7A, 7B, 7C, 8A, 8B, and 8C are diagrams illustrating an example of the manufacturing process of the imaging element 1 similarly to FIGS. 3A, 3B, 3C, 4A, 4B, 4C, 5A, 5B, 5C, 6A, and 6B. This manufacturing process differs from the manufacturing process of FIGS. 3A, 3B, 3C, 4A, 4B, 4C, 5A, 5B, 5C, 6A, and 6B in that the light guide wall 160 is formed after the color filter 140 is arranged. The manufacturing process illustrated in FIGS. 7A, 7B, 7C, 8A, 8B, and 8C a are process following the process FIG. 4B.

Figure 7A:
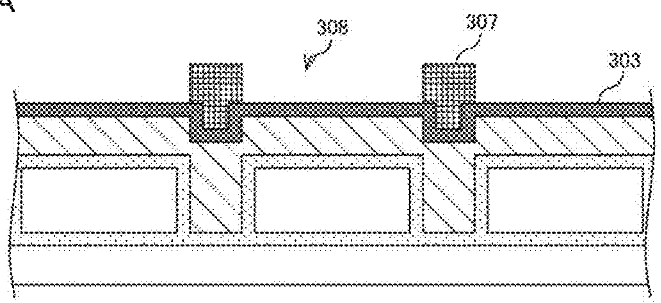
FIGS. 7A, 7B, and 7C are diagrams illustrating another example of a method for manufacturing an imaging element according to the first embodiment of the present disclosure.

A resist 307 is arranged on the surface of the material film 303 of the light guide wall bottom film 150. The resist 307 is a resist having a shape that covers the recess 169 of the material film 303 of the light guide wall bottom film 150, and has an opening 308 formed in a region other than the region where the light guide wall 160 is arranged (FIG. 7A).

Figure 7B:
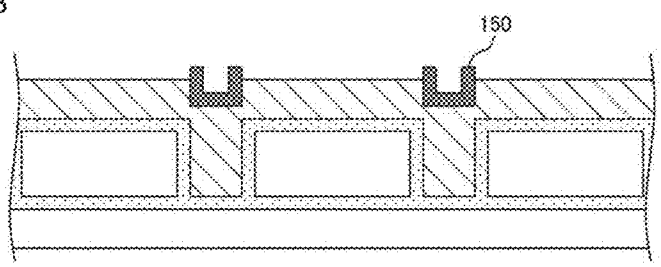

Next, the material film 303 of the light guide wall bottom film 150 is etched using the resist 307 as a mask. This can be performed by dry etching or wet etching. Then, the resist 307 is peeled off. In this way, the light guide wall bottom film 150 can be formed (FIG. 7B).

Figure 7C:
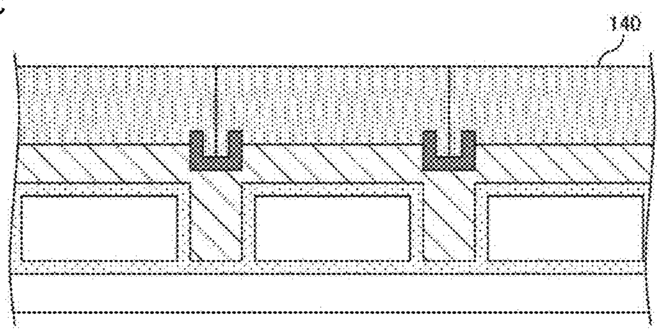

Next, the color filter 140 is arranged on the surface of the interlayer film 132. At this time, the color filter 140 is arranged in a shape that covers the light guide wall bottom film 150 (FIG. 7C).

Figure 8A:
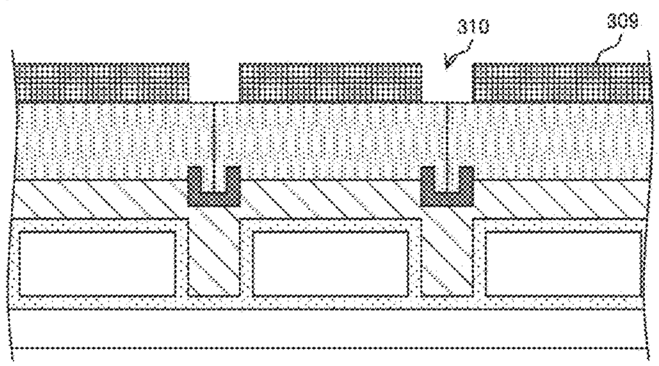
FIGS. 8A, 8B, and 8C are diagrams illustrating another example of a method for manufacturing an imaging element according to the first embodiment of the present disclosure.

Next, a resist 309 is arranged on the surface of the color filter 140. In this resist 309, an opening 310 is formed in a region where the light guide wall 160 is arranged (FIG. 8A).

Figure 8B:
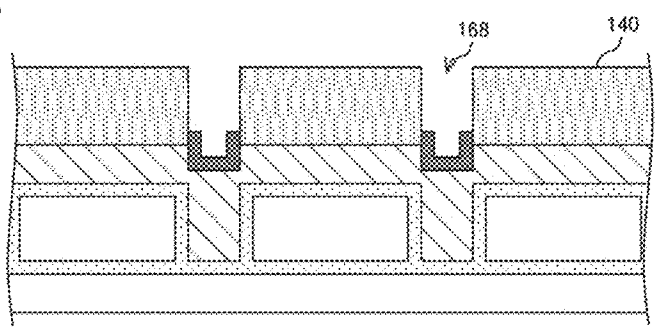

Next, the resist 309 is used as a mask to etch the color filter 140. This etching can be performed by dry etching. At the time of this etching, the light guide wall bottom film 150 can be used as an etching stopper. Specifically, the etching of the color filter 140 can be stopped on the surface of the light guide wall bottom film 150 by performing etching under the condition that the selectivity of the light guide wall bottom film 150 is higher than that of the color filter 140. As a result, the groove 168 can be formed (FIG. 8B). After that, the resist 309 is peeled off.

Figure 8C:
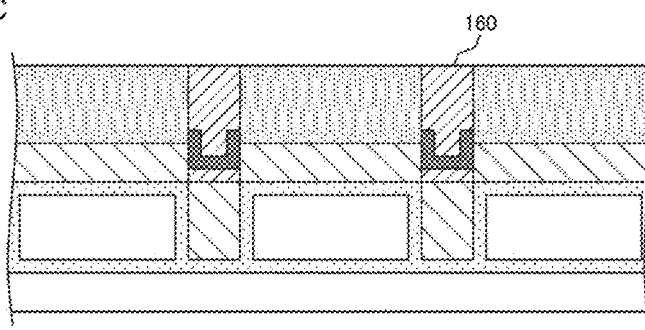

Next, the light guide wall 160 is formed by embedding the material of the light guide wall 160 in the groove 168. This can be performed, for example, by arranging a film of SiO2, which is a material of the light guide wall 160, on the surface of the color filter 140 and the groove 168 by CVD or the like, and removing SiO2 in a region other than the inside of the groove 168. Specifically, it can be performed by polishing SiO2 arranged on the surface of the color filter 140 by chemical mechanical polishing (CMP). In this way, the light guide wall 160 can be formed (FIG. 8C). After that, the imaging element 1 can be manufactured by arranging the on-chip lens 170.

As described above, in the imaging element 1 of the first embodiment of the present disclosure, the light guide wall 160 extending from the light receiving end of the color filter 140 to the vicinity of the bottom of the interlayer film 132 is arranged at the boundary of the pixels 100. Thus, the incident light of the pixel 100 can be guided to the photoelectric conversion unit 101. Accordingly, the sensitivity of the pixel 100 can be improved.

2. Second Embodiment

In the imaging element 1 of the first embodiment described above, the light guide wall bottom film 150 arranged on the bottom and side surfaces of the recess 169 of the interlayer film 132 and having a uniform film thickness is arranged. On the other hand, the imaging element 1 of a second embodiment of the present disclosure is different from that of the first embodiment in that the light guide wall bottom film 150 having a different shape is arranged.

[Configuration of Light Guide Wall and Light Guide Wall Bottom Film]

Figure 9A:
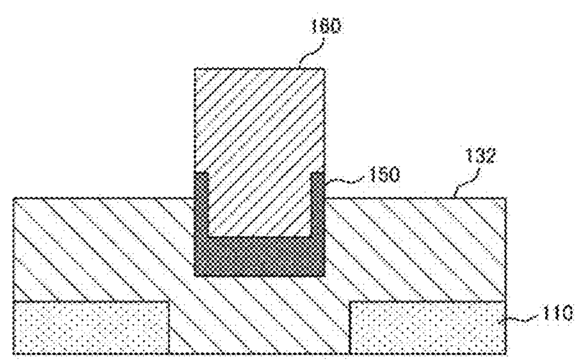
FIGS. 9A and 9B are diagrams illustrating a configuration example of a light guide wall and a light guide wall bottom film according to a second embodiment of the present disclosure.
Figure 9B:
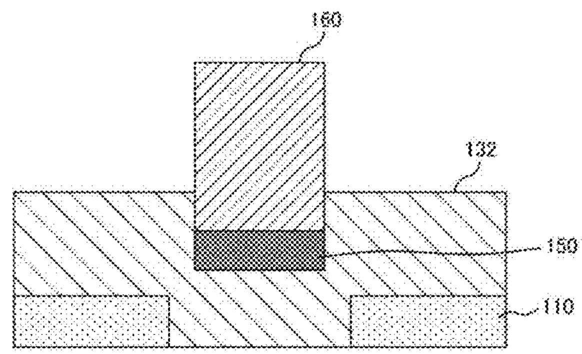

FIGS. 9A and 9B are diagrams illustrating a configuration example of a light guide wall and a light guide wall bottom film according to a second embodiment of the present disclosure. FIGS. 9A and 9B are cross-sectional view illustrating a configuration example of the light guide wall 160 and the light guide wall bottom film 150, and is a simplified view of the light guide wall 160 and the light guide wall bottom film 150.

FIG. 9A is a diagram illustrating an example of the light guide wall bottom film 150 whose bottom surface is thicker than the side surface. By reducing the film thickness of the side surfaces, it is possible to suppress the absorption of incident light on the side surfaces of the light guide wall bottom film 150. The incident light reflected by the light guide wall 160 in the portion adjacent to the side surface of the light guide wall bottom film 150 can be increased, and the decrease in the light guiding efficiency of the light guide wall 160 can be reduced. When the light guide wall bottom film 150 formed of a member having a relatively high refractive index such as SiN is adopted, it is preferable to adopt the shape of the light guide wall bottom film 150 illustrated in FIG. 9A.

Further, by increasing the film thickness of the bottom surface of the light guide wall bottom film 150, the barrier effect against contaminants can be improved, and the diffusion of contaminants into the semiconductor substrate 110 can be further suppressed. Further, by increasing the film thickness of the bottom surface of the light guide wall bottom film 150, the adhesion strength can be improved, and the mechanical strength of the light guide wall 160 can be improved.

FIG. 9B is a diagram illustrating an example of the light guide wall bottom film 150 having a shape in which the film thickness of the bottom surface is increased and the side surface portion is removed. The absorption of incident light on the side surface of the light guide wall bottom film 150 can be further suppressed, and the decrease in the light guiding efficiency of the light guide wall 160 can be further reduced.

Such a light guide wall bottom film 150 having different film thicknesses on the bottom surface and the side surface can be formed by adjusting the step coverage when the material film 303 of the light guide wall bottom film 150 is formed by CVD or the like.

[Other Configuration of Light Guide Wall and Light Guide Wall Bottom Film]

FIGS. 10A, 10B, 11A, 11B, 12A, 12B, and 12C are views illustrating other configuration examples of the light guide wall and the light guide wall bottom film according to the second embodiment of the present disclosure. FIGS. 10A, 10B, 11A, 11B, 12A, 12B, and 12C are cross-sectional views illustrating a configuration example of the light guide wall 160 and the light guide wall bottom film 150, and are simplified views of the light guide wall 160 and the light guide wall bottom film 150 similarly to FIGS. 9A and 9B.

Figure 10A:
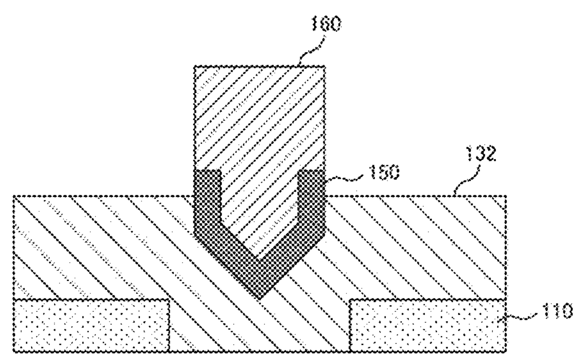
FIGS. 10A and 10B are diagrams illustrating another configuration example of the light guide wall and the light guide wall bottom film according to the second embodiment of the present disclosure.

FIG. 10A is a diagram illustrating an example of a light guide wall bottom film 150 having a tapered bottom surface and a light guide wall 160 adjacent to the light guide wall bottom film 150. Compared with the light guide wall bottom film 150 and the light guide wall 160 described with reference to FIG. 2, the distance from the semiconductor substrate 110 can be increased while maintaining the length of the light guide wall 160. The light guiding distance of the incident light can be lengthened, and the influence of contaminants diffusing from the light guide wall 160 can be reduced. This is because the light guide wall 160 can be separated from the semiconductor substrate 110.

Figure 10B:
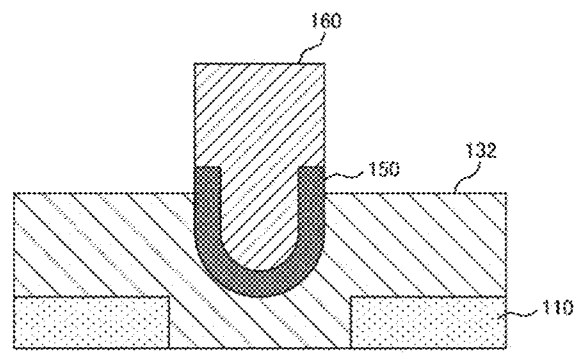

FIG. 10B is a diagram illustrating an example of a light guide wall bottom film 150 having a U-shaped bottom surface and a light guide wall 160 adjacent to the light guide wall bottom film 150. Similar to the light guide wall bottom film 150 and the light guide wall 160 of FIG. 10A, the light guiding distance of the incident light can be increased and the influence of contaminants diffusing from the light guide wall 160 can be reduced.

Figure 11A:
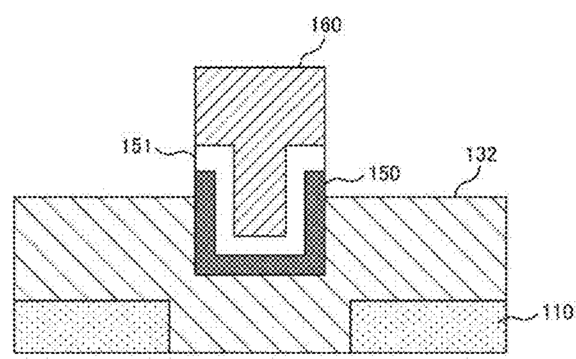
FIGS. 11A and 11B are diagrams illustrating another configuration example of the light guide wall and the light guide wall bottom film according to the second embodiment of the present disclosure.

FIG. 11A is a diagram illustrating an example of a light guide wall bottom film having multiple layers. Stacked light guide wall bottom films 150 and 151 are arranged at the bottom of the light guide wall 160 of FIG. 11A. The light guide wall bottom film 151 is a light guide wall bottom film that has a different action and effect from the light guide wall bottom film 150. For example, a film having an etching stopper function can be used for the light guide wall bottom film 151, and a film having a function of blocking incident light can be used for the light guide wall bottom film 150. Specifically, the light guide wall bottom film 151 can be made of SiN, and the light guide wall bottom film 150 can be made of W. Further, for example, a film for improving the adhesion strength can be used for the light guide wall bottom film 150. In this case, the light guide wall bottom film 150 can be made of SiO2. Further, for example, a film for preventing the movement of contaminants can be used for the light guide wall bottom film 150. Also in this case, the light guide wall bottom film 150 can be made of SiO2.

The configuration of the light guide wall bottom film of FIG. 11A is not limited to this example. For example, a light guide wall bottom film stacked in three or more layers can also be used.

Figure 11B:
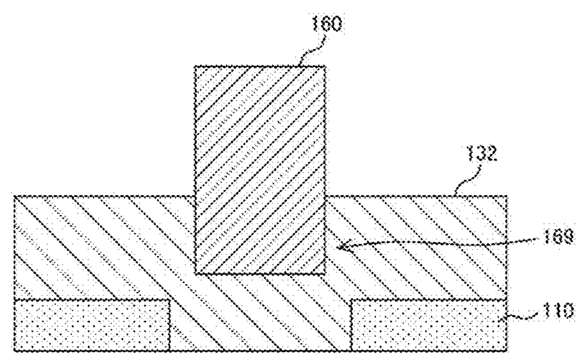

FIG. 11B shows an example in which the light guide wall bottom film is omitted. The light guide wall 160 of B in the figure is arranged adjacent to the recess 169 of the interlayer film 132.

Figure 12A:
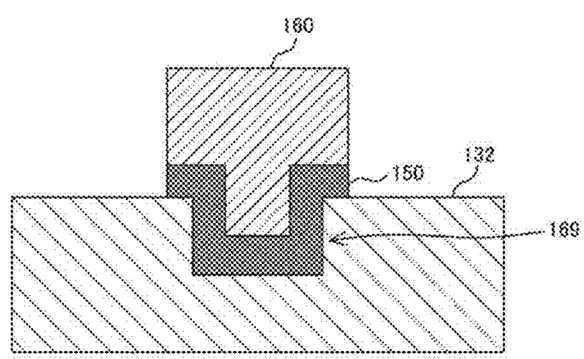
FIGS. 12A, 12B, and 12C are diagrams illustrating another configuration example of the light guide wall and the light guide wall bottom film according to the second embodiment of the present disclosure.

FIG. 12A is a diagram illustrating a light guide wall 160 having a shape in which the width of a portion arranged in the region of the interlayer film 132 is reduced. The light guide wall 160 of FIG. 12A can be formed by arranging a recess 169 having a width narrower than that of the light guide wall 160 in the interlayer film 132.

Figure 12B:
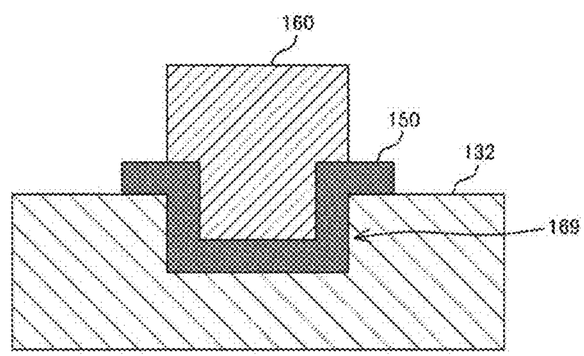

FIG. 12B is a diagram illustrating the light guide wall bottom film 150 having a shape overhanging in the outer region of the light guide wall 160. The light blocking ability of the light guide wall bottom film 150 can be improved.

Figure 12C:
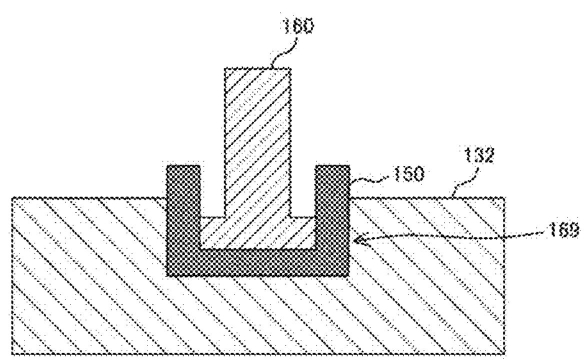

FIG. 12C shows an example of a light guide wall 160 having a width narrower than that of the recess 169 of the interlayer film 132. This is an example in which the recess 169 has a margin in size in consideration of the variation when forming the light guide wall 160.

A configuration of the imaging element 1 other than the aforementioned configuration is the same as the configuration of the imaging element 1 described in the first embodiment of the present disclosure and thus description thereof will be omitted.

As described above, in the imaging element 1 of the second embodiment of the present disclosure, the light guide wall 160 and the light guide wall bottom film 150 having different shapes from those of the first embodiment are arranged so that incident light can be guided.

3. Third Embodiment

In the imaging element 1 of the first embodiment described above, the separation portion 130 is formed in the semiconductor substrate 110. On the other hand, the imaging element 1 of a third embodiment of the present disclosure is different from that of the first embodiment in that the separation portion 130 is omitted.

[Pixel Configuration]

Figure 13:
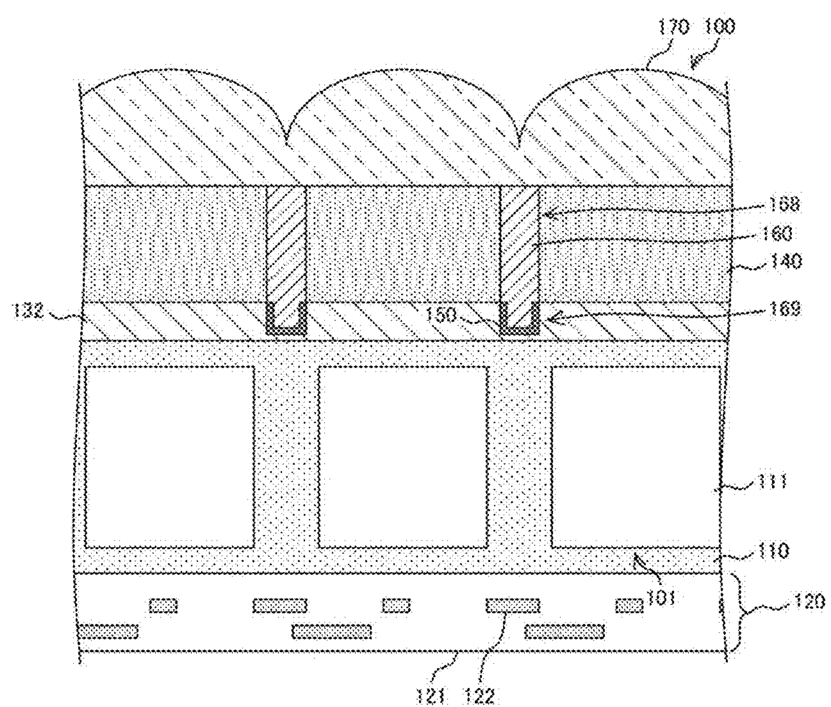
FIG. 13 is a diagram illustrating a configuration example of a pixel according to a third embodiment of the present disclosure.

FIG. 13 is a diagram illustrating a configuration example of a pixel according to the third embodiment of the present disclosure. FIG. 13 is a schematic cross-sectional view illustrating a configuration example of the pixel 100 similarly to FIG. 2. This pixel differs from the pixel 100 described in FIG. 2 in that the separation portion 130 is omitted.

The semiconductor substrate 110 in the figure has a well region arranged at the boundary of the pixels 100 and each pixel 100 is separated from adjacent pixels 100. By arranging a well region having a high impurity concentration as a well region at the boundary of the pixels 100, the ability to separate the pixels 100 can be improved. Since the light guide wall 160 is arranged in the region of the color filter 140 and the interlayer film 132, the incident light is guided in the same manner as in the imaging element 1 of FIG. 2.

A configuration of the imaging element 1 other than the aforementioned configuration is the same as the configuration of the imaging element 1 described in the first embodiment of the present disclosure and thus description thereof will be omitted.

As described above, in the imaging element 1 of the third embodiment of the present disclosure, the configuration of the pixel 100 can be simplified by omitting the separation portion 130 of the semiconductor substrate 110.

4. Fourth Embodiment

The imaging element 1 of the first embodiment described above uses the light guide wall 160 made of a resin or the like. On the other hand, the imaging element 1 of the fourth embodiment of the present disclosure is different from that of the first embodiment in that a light guide wall formed of voids is used.

[Pixel Configuration]

Figure 14:
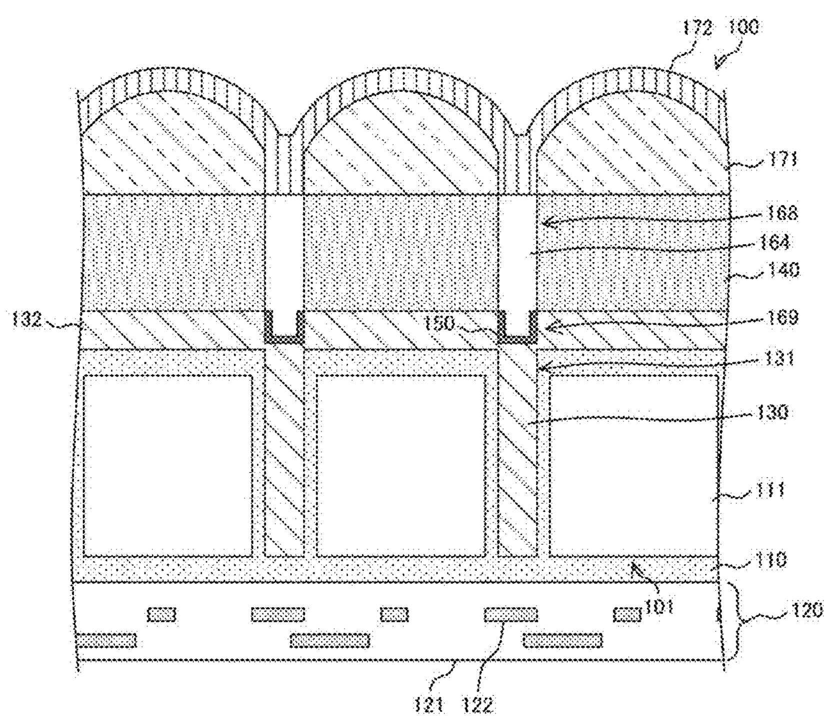
FIG. 14 is a diagram illustrating a configuration example of a pixel according to a fourth embodiment of the present disclosure.

FIG. 14 is a diagram illustrating a configuration example of a pixel according to the fourth embodiment of the present disclosure. The figure is a schematic cross-sectional view illustrating a configuration example of the pixel 100 similarly to FIG. 2. This pixel differs from the pixel 100 described in FIG. 2 in that a light guide wall 164 is arranged in place of the light guide wall 160 and a closing film 172 is further arranged.

The light guide wall 164 in the figure is formed of voids. This void can be formed, for example, by the gas enclosed in the groove 168 formed in the color filter 140 and the recess 169 of the interlayer film 132. In addition, the void can be evacuated. Since such a void has a low refractive index, the light guiding efficiency can be improved by arranging the light guide wall 164. Such a void can be formed by forming a groove 168 at the boundary of the pixels 100 on which the color filter 140 and the on-chip lens 170 are formed and closing the upper portion of the groove 168.

The closing film 172 is arranged on the upper surface of the light guide wall 164 to close the light guide wall 164 formed of voids. The closing film 172 is arranged on the front surface and the side surfaces of the on-chip lens 170 to close the groove 168 described above. The closing film 172 can be made of, for example, a resin or $SiO_2$.

[Method for Manufacturing Imaging Element]

Figure 15A:
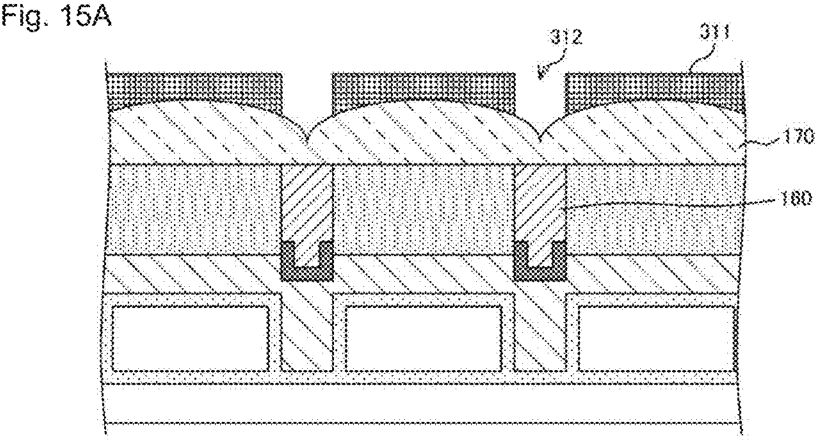
FIGS. 15A and 15B are diagrams illustrating an example of a method for manufacturing an imaging element according to a fourth embodiment of the present disclosure.
Figure 15B:
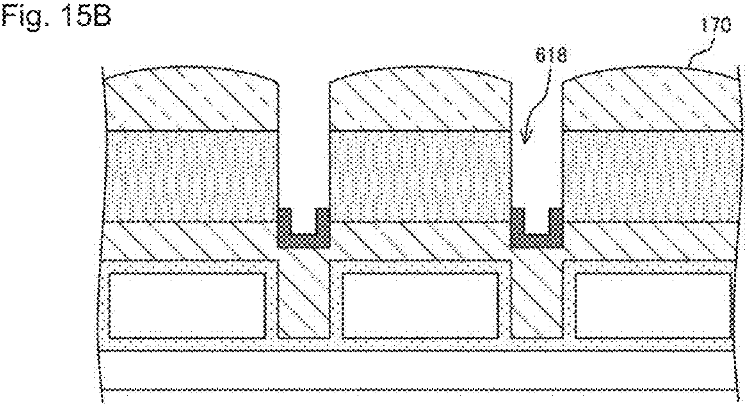
Figure 16:
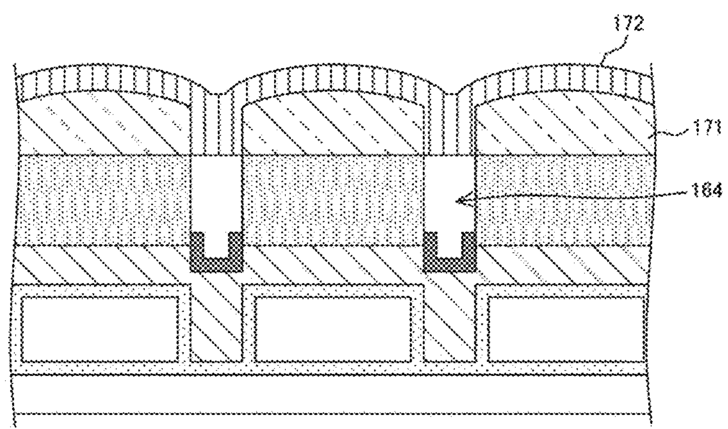
FIG. 16 is a diagram illustrating an example of a method for manufacturing an imaging element according to the fourth embodiment of the present disclosure.

FIGS. 15A, 15B, and 16 are diagrams illustrating an example of a method for manufacturing the imaging element according to the fourth embodiment of the present disclosure. FIGS. 15A, 15B, and 16 are diagrams illustrating an example of the manufacturing process of the imaging element 1, and are the processes following the process FIG. 6B.

First, a resist 311 is arranged on the surface of the on-chip lens 170. The resist 311 has an opening 312 formed in a region where the light guide wall 164 is arranged (FIG. 15A).

Next, the resist 311 is used as a mask to etch the on-chip lens 170 and the light guide wall 160. This can be performed by dry etching. As a result, the groove 168 is formed in the region where the light guide wall 160 and the end portions of the on-chip lens 170 are arranged (FIG. 15B).

Next, the closing film 172 is arranged to close the groove 168. This can be performed by applying a resin that is a material of the closing film 172. Further, when the film of SiO2 is adopted as the closing film 172, it can be formed by CVD (FIG. 16). By this process, the light guide wall 164 can be formed.

By the processes described above, the light guide wall 164 formed of voids can be manufactured. As described above, in the process represented by FIG. 15B, the light guide wall 160 is removed by etching. Therefore, it is preferable that the light guide wall 160 is formed of a member that can be easily removed by dry etching such as an acrylic resin.

[Another Method for Manufacturing Imaging Element]

Figure 17:
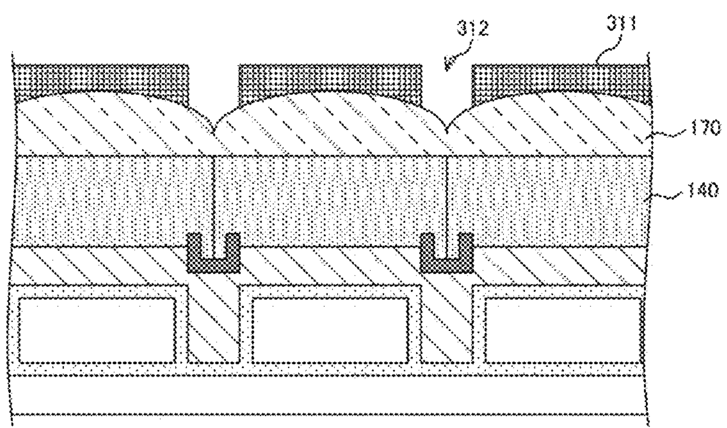
FIG. 17 is a diagram illustrating another example of a method for manufacturing an imaging element according to the fourth embodiment of the present disclosure.

FIG. 17 is a diagram illustrating an example of a method for manufacturing an imaging element according to the fourth embodiment of the present disclosure. FIG. 17 is a diagram illustrating an example of a manufacturing process of the imaging element 1, and is the process following the process FIG. 7C.

First, the on-chip lens 170 is formed on the surface of the color filter 140. Next, the resist 311 described above is formed on the surface of the on-chip lens 170 (FIG. 17). Next, etching is performed in the same manner as in the process FIG. 15B to form the groove 168, and the closing film 172 is arranged in the same manner as in the process Nin FIG. 16. The light guide wall 164 formed of voids can also be formed by the above-described processes.

A configuration of the imaging element 1 other than the aforementioned configuration is the same as the configuration of the imaging element 1 described in the first embodiment of the present disclosure and thus description thereof will be omitted.

As described above, in the imaging element 1 of the fourth embodiment of the present disclosure, the sensitivity of the pixel 100 can be further improved by arranging the light guide wall 164 formed of voids.

5. Fifth Embodiment

In the imaging element 1 of the first embodiment described above, the light guide wall 160 is arranged adjacent to the color filter 140. On the other hand, the imaging element 1 of the fifth embodiment of the present disclosure is different from that of the first embodiment in that a protective film is arranged between the light guide wall 160 and the color filter 140.

[Pixel Configuration]

Figure 18:
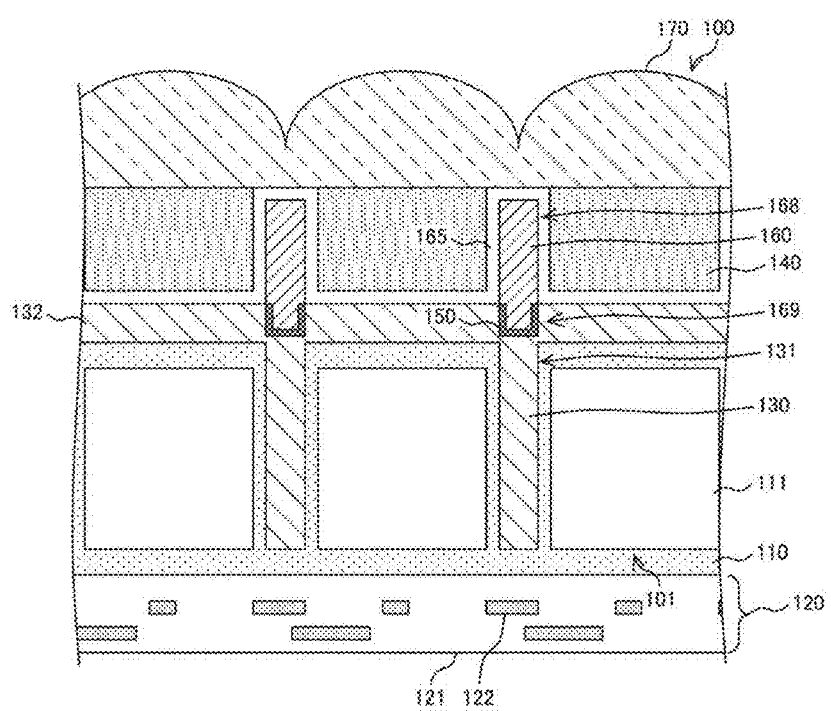
FIG. 18 is a diagram illustrating a configuration example of a pixel according to a fifth embodiment of the present disclosure.

FIG. 18 is a diagram illustrating a configuration example of a pixel according to the fifth embodiment of the present disclosure. The figure is a schematic cross-sectional view illustrating a configuration example of the pixel 100 similarly to FIG. 2. This pixel differs from the pixel 100 described in FIG. 2 in that a protective film 165 is further arranged.

The protective film 165 is arranged between the light guide wall 160 and the color filter 140 to protect the light guide wall 164. This protective film 165 can be made of, for example, a SiO2 film. The protective film 165 in the figure is further arranged between the color filter 140 and the interlayer film 132. By arranging the protective film 165, it is possible to prevent the light guide wall 160 from being damaged in the manufacturing process of the imaging element 1 or the like. The protective film 165 can be formed, for example, by stacking a SiO2 film on the surfaces of the light guide wall 160 and the interlayer film 132 after the process FIG. 5C.

A configuration of the imaging element 1 other than the aforementioned configuration is the same as the configuration of the imaging element 1 described in the first embodiment of the present disclosure and thus description thereof will be omitted.

As described above, the imaging element 1 of the fifth embodiment of the present disclosure can protect the light guide wall 160 by arranging the protective film 165. The strength of the pixel 100 can be improved in the manufacturing process of the imaging element 1.

6. Example of Application to Camera

The technology according to the present disclosure (the present technology) can be applied to various products. For example, the present technology may be realized as an imaging element mounted in an imaging device such as a camera.

Figure 19:
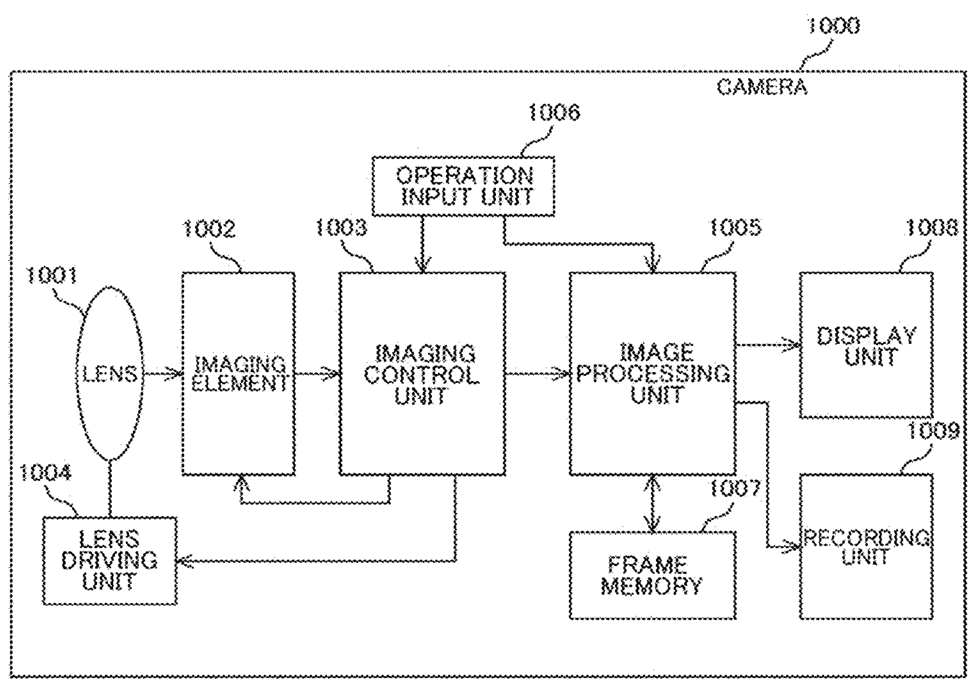
FIG. 19 is a block diagram illustrating a schematic configuration example of a camera which is an example of an imaging device to which the present technology is applicable.

FIG. 19 is a block diagram illustrating a schematic configuration example of a camera which is an example of an imaging device to which the present technology is applicable. A camera 1000 in the figure includes a lens 1001, an imaging element 1002, an imaging control unit 1003, a lens driving unit 1004, an image processing unit 1005, an operation input unit 1006, a frame memory 1007, a display unit 1008, and a recording unit 1009.

The lens 1001 is an imaging lens of the camera 1000. The lens 1001 concentrates light from a subject and causes the concentrated light to be incident on the imaging element 1002 which will be described later to image the subject.

The imaging element 1002 is a semiconductor element that images light from a subject concentrated by the lens 1001. The imaging element 1002 generates an analog image signal in response to radiated light, converts the analog image signal into a digital image signal, and outputs the digital image signal.

The imaging control unit 1003 controls imaging in the imaging element 1002. The imaging control unit 1003 controls the imaging element 1002 by generating a control signal and outputting the control signal to the imaging element 1002. In addition, the imaging control unit 1003 can perform auto-focus in the camera 1000 on the basis of an image signal output from the imaging element 1002. Here, the auto-focus is a system that detects a focal position of the lens 1001 and automatically adjusts the focal position. As the auto-focus, a method of detecting an image surface phase difference according to phase difference pixels disposed in the imaging element 1002 to detect a focal position (image surface phase difference auto-focus) can be used. In addition, a method of detecting a position at which the contrast of an image is maximized as a focal position (contrast auto-focus) can also be applied. The imaging control unit 1003 adjusts the position of the lens 1001 through the lens driving unit 1004 on the basis of the detected focal position and performs auto-focus. Meanwhile, the imaging control unit 1003 can be configured as, for example, a digital signal processor (DSP) provided with firmware.

The lens driving unit 1004 drives the lens 1001 on the basis of control of the imaging control unit 1003. The lens driving unit 1004 can drive the lens 1001 by changing the position of the lens 1001 using a motor embedded therein.

The image processing unit 1005 processes an image signal generated by the imaging element 1002. This processing corresponds to, for example, demosaicing for generating an image signal of an omitted color among image signals corresponding to red, green, and blue for each pixel, noise reduction for removing noise in an image signal, image signal encoding, and the like. The image processing unit 1005 can be configured as, for example, a microcomputer provided with firmware.

The operation input unit 1006 receives an operation input from a user of the camera 1000. For example, a press button or a touch panel can be used as the operation input unit 1006. An operation input received by the operation input unit 1006 is transmitted to the imaging control unit 1003 and the image processing unit 1005. Thereafter, processing in response to the operation input, for example, processing of imaging a subject, and the like is started.

The frame memory 1007 is a memory storing a frame that is an image signal corresponding to one screen. The frame memory 1007 is controlled by the image processing unit 1005 and holds frames in a procedure of image processing.

The display unit 1008 displays an image processed by the image processing unit 1005. For example, a liquid crystal panel can be used as the display unit 1008.

The recording unit 1009 records an image processed by the image processing unit 1005. For example, a memory card or a hard disk can be used as the recording unit 1009.

The camera to which the present disclosure can be applied has been described above. The present technology can be applied to the imaging element 1002 among the components described above. Specifically, the imaging element 1 described in FIG. 1 can be applied to the imaging element 1002. The sensitivity of the camera 1000 can be improved by applying the imaging element 1 to the imaging element 1002. Meanwhile, the image processing unit 1005 is an example of a processing circuit described in the claims. The camera 1000 is an example of an imaging device described in the claims.

The configuration of the pixel 100 of the second embodiment can be combined with other embodiments. Specifically, the shapes of the light guide wall 160 and the light guide wall bottom film 150 of FIGS. 9A, 9B, 10A, 10B, 11A, 11B, 12A, 12B, and 12C can be applied to the light guide wall 160 and the light guide wall bottom film 150 of FIGS. 13 and 14.

The configuration of the pixel 100 of the third embodiment can be combined with other embodiments. Specifically, in the pixels 100 of FIGS. 9A, 9B, 10A, 10B, 11A, 11B, 12A, 12B, 12C and 14, the separation portion 130 of the semiconductor substrate 110 can be omitted.

The configuration of the pixel 100 of the fourth embodiment can be combined with other embodiments. Specifically, the light guide wall 164 and the closing film 172 of FIG. 14 can be applied to the pixels 100 of FIGS. 9A, 9B, 10A, 10B, 11A, 11B, 12A, 12B, 12C, and 13.

Finally, description of each of the above-described embodiments is an example of the present disclosure and the present disclosure is not limited to the above-described embodiments. Accordingly, it is needless to say that various modifications can be made depending on design and the like without departing from the technical spirit according to the present disclosure in addition to the above-described embodiments.

Additionally, the effects described in the present specification are merely exemplary and not limited. Further, other effects may be obtained.

In addition, the drawings in the above-described embodiments are schematic and dimensional ratios and the like of respective parts are not necessarily consistent with real ones. In addition, it is needless to say that drawings include parts where dimensional relationships and ratios differ between the drawings.

Further, the present technology can also have the following configurations.

(1) An imaging element including:

pixels each including: a photoelectric conversion unit arranged in a semiconductor substrate to perform photoelectric conversion on incident light, an on-chip lens that concentrates the incident light on the photoelectric conversion unit, a color filter that transmits incident light having a predetermined wavelength within the concentrated incident light, and an interlayer film disposed between the semiconductor substrate and the color filter; and a light guide wall disposed at a boundary of the pixels and formed in a shape of surrounding the color filter, the light guide wall having an end portion disposed in a recess surrounding the pixel formed in the interlayer film at the boundary of the pixels to guide the incident light.

(2) The imaging element according to (1), wherein the light guide wall is formed of a member having a refractive index different from that of the color filter.

(3) The imaging element according to (2), wherein the light guide wall is formed of a member having a refractive index lower than that of the color filter.

(4) The imaging element according to (3), wherein the light guide wall is made of an oxide.

(5) The imaging element according to (3), wherein the light guide wall is made of a resin.

(6) The imaging element according to (3), wherein the light guide wall is formed of voids.

(7) The imaging element according to any one of (1) to (6), further including: a separation portion that is arranged in the semiconductor substrate at the boundary of the pixels to separate the photoelectric conversion units.

(8) The imaging element according to any one of (1) to (7), further including: a light guide wall bottom film which is a film arranged at a bottom of the recess and adjacent to the light guide wall.

(9) The imaging element according to (8), wherein the light guide wall bottom film is further arranged on side surfaces of the recess.

(10) The imaging element according to (8), wherein the light guide wall bottom film is a film that stops the progress of etching when the light guide wall is formed by etching.

(11) The imaging element according to (8), wherein the light guide wall bottom film is a film that blocks the incident light.

(12) The imaging element according to (8), wherein the light guide wall bottom film is a film that brings the light guide wall into close contact with the interlayer film.

(13) The imaging element according to (8), wherein the light guide wall bottom film is a film that prevents movement of contaminants to the semiconductor substrate.

(14) The imaging element according to (8), wherein the light guide wall bottom film is made of metal.

(15) The imaging element according to (8), wherein the light guide wall bottom film is made of a silicon nitride.

(16) The imaging element according to (8), wherein the light guide wall bottom film is made of an oxide.

(17) The imaging element according to any one of (1) to (16), further including: a protective film arranged between the color filter and the light guide wall.

(18) An imaging device including:

pixels each including: a photoelectric conversion unit arranged in a semiconductor substrate to perform photoelectric conversion on incident light, an on-chip lens that concentrates the incident light on the photoelectric conversion unit, a color filter that transmits incident light having a predetermined wavelength within the concentrated incident light, and an interlayer film disposed between the semiconductor substrate and the color filter;

a light guide wall disposed at a boundary of the pixels and formed in a shape of surrounding the color filter, the light guide wall having an end portion disposed in a recess surrounding the pixel formed in the interlayer film at the boundary of the pixels to guide the incident light; and a processing circuit that processes an image signal generated based on the photoelectric conversion.

REFERENCE SIGNS LIST

1 Imaging element
10 Pixel array unit
30 Column signal processing unit
100 Pixel
101 Photoelectric conversion unit
110 Semiconductor substrate
130 Separation portion
131, 168 Groove
132 Interlayer film
140 Color filter
150 Light guide wall bottom film
151 Light guide wall bottom film
160, 164 Light guide wall
165 Protective film
169 Recess
170 On-chip lens
172 Closing film
1002 Imaging element
1005 Image processing unit

The invention claimed is:

1. An imaging element, comprising:

a plurality of pixels, wherein each pixel of the plurality of pixels includes:

a semiconductor substrate, wherein the semiconductor substrate includes a front surface side and a back surface side, and the front surface side is opposite to the back surface side;

a plurality of wiring layers on the front surface side of the semiconductor substrate;

an interlayer film, wherein the interlayer film includes a first surface side and a second surface side, and the second surface side of the interlayer film is on the back surface side of the semiconductor substrate;

a plurality of color filters, wherein the plurality of color filters includes a first color filter and a second color filter, and the first color filter and the second color filter are on the first surface side of the interlayer film;

a recess in the interlayer film at a boundary of the plurality of pixels;

a light guide wall bottom film on the recess; and a light guide wall between the first color filter and the second color filter, wherein the light guide wall bottom film is between the light guide wall and the recess.

2. The imaging element according to claim 1, wherein a refractive index of the light guide wall is different from a refractive index of the first color filter.

3. The imaging element according to claim 2, wherein the refractive index of the light guide wall is lower than the refractive index of the first color filter.

4. The imaging element according to claim 3, wherein the light guide wall comprises an oxide.

5. The imaging element according to claim 3, wherein the light guide wall comprises a resin.

6. The imaging element according to claim 3, wherein the light guide wall is a void.

7. The imaging element according to claim 1, further comprising a separation portion in the semiconductor substrate, wherein the plurality of pixels comprises a first pixel and a second pixel, the first pixel is adjacent to the second pixel, and the separation portion separates a photoelectric conversion unit of the first pixel from a photoelectric conversion unit of the second pixel.

8. The imaging element according to claim 1, wherein the light guide wall bottom film is on side surfaces of the recess.

9. The imaging element according to claim 1, wherein the light guide wall bottom film is an etching stopper film.

10. The imaging element according to claim 1, wherein the light guide wall bottom film is a film that is configured to block light of a specific wavelength.

11. The imaging element according to claim 1, wherein the light guide wall bottom film brings the light guide wall into close contact with the interlayer film.

12. The imaging element according to claim 1, wherein the light guide wall bottom film is configured to prevent a movement of contaminants to the semiconductor substrate.

13. The imaging element according to claim 1, wherein the light guide wall bottom film comprises a metal.

14. The imaging element according to claim 1, wherein the light guide wall bottom film comprises a silicon nitride.

15. The imaging element according to claim 1, wherein the light guide wall bottom film comprises an oxide.

16. The imaging element according to claim 1, further comprising a protective film between the first color filter and the light guide wall.

17. An imaging element, comprising:

a plurality of pixels configured to generate an image signal, wherein each pixel of the plurality of pixels includes:

a semiconductor substrate, wherein the semiconductor substrate includes a front surface side and a back surface side, and the front surface side is opposite to the back surface side;

a plurality of wiring layers on the front surface side of the semiconductor substrate;

an interlayer film, wherein the interlayer film includes a first surface side and a second surface side, and the second surface side of the interlayer film is on the back surface side of the semiconductor substrate;

a plurality of color filters, wherein the plurality of color filters includes a first color filter and a second color filter, and the first color filter and the second color filter are on the first surface side of the interlayer film;

a recess in the interlayer film at a boundary of the plurality of pixels;

a light guide wall bottom film on the recess; and a light guide wall between the first color filter and the second color filter, wherein the light guide wall bottom film is between the light guide wall and the recess; and a processing circuit configured to process the image signal.

18. The imaging element according to claim 1, wherein the light guide wall bottom film includes a U-shaped bottom surface.

* * * * *